(12) United States Patent
Kondo

(10) Patent No.: US 7,561,570 B2
(45) Date of Patent: Jul. 14, 2009

(54) IP MULTICAST DISTRIBUTION SYSTEM, STREAMING DATA DISTRIBUTION SYSTEM AND PROGRAM THEREFOR

(75) Inventor: Eiichi Kondo, Tokyo (JP)

(73) Assignee: NEC Corporation, Tokyo (JP)

( * ) Notice: Subject to any disclaimer, the term of this patent is extended or adjusted under 35 U.S.C. 154(b) by 717 days.

(21) Appl. No.: 10/859,100

(22) Filed: Jun. 3, 2004

(65) Prior Publication Data

US 2005/0002395 A1  Jan. 6, 2005

(30) Foreign Application Priority Data

Jun. 4, 2003  (JP) .............................. 2003-159421

(51) Int. Cl.
*H04L 12/56* (2006.01)
*H04L 12/66* (2006.01)
(52) U.S. Cl. ................... 370/392; 370/401; 370/466
(58) Field of Classification Search .................. None
See application file for complete search history.

(56) References Cited

U.S. PATENT DOCUMENTS

| | | | | |
|---|---|---|---|---|
| 6,163,810 | A * | 12/2000 | Bhagavath et al. | 709/238 |
| 6,584,096 | B1 * | 6/2003 | Allan | 370/352 |
| 6,985,479 | B2 * | 1/2006 | Leung et al. | 370/352 |
| 7,079,495 | B1 * | 7/2006 | Pearce et al. | 370/260 |
| 7,450,560 | B1 * | 11/2008 | Grabelsky et al. | 370/352 |
| 2004/0098448 | A1 * | 5/2004 | Fukushima et al. | 709/201 |

FOREIGN PATENT DOCUMENTS

| | | |
|---|---|---|
| JP | H10-242962 A | 9/1998 |
| JP | H11-150566 A | 6/1999 |
| JP | 2002-185528 A | 6/2002 |
| KR | 2000-0036891 A | 7/2000 |
| WO | WO 02/103964 A1 | 12/2002 |

OTHER PUBLICATIONS

P. Srisuresh et al., "IP Network Address Translator (NAT) Terminology and Considerations", Lucent Technologies, Network Working Group, RFC 2663, Aug. 1999, pp. 1-30.

* cited by examiner

*Primary Examiner*—Gregory B Sefcheck
(74) *Attorney, Agent, or Firm*—Sughrue Mion, PLLC

(57) ABSTRACT

Disclosed is an IP multicast distribution system that can convert IP multicast data into packets for individual unicast addresses and can transmit the data to a recipient host in a private address space. According to the present invention, before accepting streaming distribution from the distribution server, a recipient host transmits, to an NAPT gateway, a distribution request for which the IP address of an MU conversion gateway is designated as a destination address, a source port number is designated a port number, determined in advance by the distribution server, in order to enable the reception of data by a reception application provided for the recipient host, and a destination port number is designated as an acceptance port number for the MU conversion gateway. Upon receiving the distribution request, the NAPT gateway designates a source IP address as the global IP address for the NAPT gateway and the source port number as the predetermined port number, and transfers data to the MU conversion gateway.

4 Claims, 4 Drawing Sheets

IP MULTICAST DISTRIBUTION SYSTEM, STREAMING DATA DISTRIBUTION SYSTEM AND PROGRAM THEREFOR

This application claims priority to prior Japanese patent application JP 2003-159421, the disclosure of which is incorporated herein by reference.

BACKGROUND OF THE INVENTION

The present invention relates to an IP multicast distribution method for simultaneously transmitting data to a plurality of recipient hosts belonging to a specific group, and relates particularly to an IP multicast distribution system for distributing, to a recipient host on a private network, streaming data using the UDP (User Datagram Protocol) packet form, a streaming data distribution method and a program therefor.

IP multicasting is available for streaming broadband data. IP multicasting allows to reduce the load on a distribution server and to effectively utilize network resources.

Most current IP networks are incompatible with IP multicasting. In order to adapt IP multicasting to such IP networks, for example, Japanese Patent Laid-Open Publication No. Hei 10-242962 discloses a gateway device for copying IP multicast packets and transmitting the copies to IP addresses of individual users. Hereinafter, such gateway device is referred to as a mulfcast/unicast conversion gateway, or a MU conversion gateway.

On the other hand, NAPT (Network Address Port Translation) is defined in RFC2662 "IP Network Address Translator (NAT) Terminology and Considerations". Hereinafter, a gateway device with a NAPT function is referred to as a NAPT gateway. A NAPT gateway not only relates between a global IP address of a sender and a private IP address of receiver, but also relates between port numbers of the sender and the receiver on a transport layer.

A NAPT gateway may transmit streaming data to a reception host in a private IP address space. In this case, since UDP, as currently applied for a streaming technology, is a connectionless protocol, streaming data is transmitted without control information for its transmission. Therefore, the NAPT gateway does not obtain correspondence between a global IP address of a distribution server and a private address of a specific recipient host, and correspondence between the port numbers of the server and of the recipient host. As a result, the NAPT gateway cannot transfer the streaming data from the distribution server to the recipient host. Namely, a UDP packet cannot be transferred from the global IP space to a private IP space unless the port number and the address in the private IP space of the recipient host are designated at the NAPT gateway.

Further, a NAPT gateway can also be set so as to transmit all UDP packets from the global IP space to a specific recipient host in a private IP space. In this case, however, the NAPT gateway cannot transmit packets to one of the other recipient hosts.

SUMMARY OF THE INVENTION

To resolve these conventional shortcomings, it is one objective of the present invention to provide an IP multicast distribution system that can, without a special setup being required for an NAPT gateway, convert IP multicast data into packets for individual unicast addresses and can transmit the data to a recipient host in a private address space, and a streaming data distribution method and a program therefor.

To achieve this objective, according to a first aspect of the present invention, an IP multicast distribution system including: a distribution server for distributing IP multicast packets with UDP packet format; a multicast/unicast conversion gateway for converting the IP multicast packet to an IP unicast packet; and an NAPT gateway for transferring the IP unicast packet to a recipient host in a private network, wherein: when the NAPT gateway receives an IP unicast packet whose destination IP address is the global IP address of the NAPT gateway and whose destination port number has been designated by the NAPT gateway; the NAPT gateway converts the value of the destination IP address included in the IP unicast packet to the local IP address of the recipient host in the private network, and converts the value of the destination port number included in the IP unicast packet to a port number which the recipient host has designated to receive data; and the NAPT gateway sends the IP unicast packet to the recipient host through the private network.

According to a second aspect of the invention, for the IP multicast distribution system of the first aspect, before receiving the IP unicast packet, the recipient host sends a distribution request for the packet to the NAPT gateway; the distribution request includes the global IP address of the multicast/unicast conversion gateway as its designation IP address, a source port number which the distribution server has designated in order that a recipient application program executed on the recipient host receives packets corresponding to the request, and a designation port number as an acceptance port number for the multicast/unicast conversion gateway; in response to the distribution request, the NAPT gateway designates the global IP address of the NAPT gateway as a source IP address, and the acceptance port number as a source port number; and the NAPT gateway sends the distribution request to the multicast/unicast conversion gateway.

According to a third aspect of the invention, for the IP multicast distribution system of the first aspect, the IP multicast packet transmits streaming data.

According to a fourth aspect of the Invention, a data distribution method, for an IP multicast distribution system including: a distribution server for distributing IP multicast packets with UDP packet format: a multicast/unicast conversion gateway for converting the IP multicast packet to an IP unicast packet; and an NAPT gateway for transferring the IP unicast packet to a recipient host in a private network, wherein the method includes, at the NAPT gateway, a packet header conversion step for receiving an IP unicast packet whose destination IP address is the global IP address of the NAPT gateway and whose destination port number has been designated by the NAPT gateway; converting the value of the destination IP address included in the IP unicast packet to the local IP address of the recipient host in the private network; converting the value of the destination port number included in the IP unicast packet to a port number which the recipient host has designated to receive data; and sending the IP unicast packet to the recipient host through the private network.

According to a fifth aspect of the invention, for the data distribution method of the fourth aspect, before receiving the IP unicast packet, the recipient host sends a distribution request for the packet to the NAPT gateway; the distribution request includes the global IP address of the multicast/unicast conversion gateway as its designation IP address, a source port number which the distribution server has designated in order that a recipient application program executed on the recipient host receives packets corresponding to the request, and a designation port number as an acceptance port number for the multicast/unicast conversion gateway; in response to the distribution request, the NAPT gateway designates the global IP address of the NAPT gateway as a source IP address, and the acceptance port number as a source port number; and the NAPT gateway sends the distribution request to the multicast/unicast conversion gateway.

According to a sixth aspect of the invention, for the data distribution method of the fourth aspect, the IP multicast packet transmits streaming data.

According to a seventh aspect of the invention, a data distribution program executed on a computer, for an IP multicast distribution system including: a distribution server for distributing IP multicast packets with UDP packet format; a multicast/unicast conversion gateway for converting the IP multicast packet to an IP unicast packet; and a NAPT gateway for transferring the IP unicast packet to a recipient host in a private network, wherein according to execution of the program, the NAPT gateway performs the following processes of: receiving an IP unicast packet whose destination IP address is the global IP address of the NAPT gateway and whose destination port number has been designated by the NAPT gateway; converting the value of the destination IP address included in the IP unicast packet to the local IP address of the recipient host in the private network; converting the value of the destination port number included in the IP unicast packet to a port number which the recipient host has designated to receive data; and sending the IP unicast packet to the recipient host through the private network.

According to an eighth aspect of the invention, for the data distribution program of the seventh aspect, before receiving the IP unicast packet, the recipient host sends a distribution request for the packet to the NAPT gateway; and the distribution request includes the global IP address of the multicast/unicast conversion gateway as its designation IP address, a source port number which the distribution server has designated in order that a recipient application program executed on the recipient host receives packets corresponding to the request, and a designation port number as an acceptance port number for the multicast/unicast conversion gateway, in response to the distribution request, according to execution of the program, the NAPT gateway performs the following processes of: designating the global IP address of the NAPT gateway as a source IP address, and the acceptance port number as a source port number, and sending the distribution request to the multicast/unicast conversion gateway.

According to a ninth aspect of the invention, for the data distribution program of the seventh aspect, the IP multicast packet transmits streaming data.

DETAILED DESCRIPTION OF THE PREFERRED EMBODIMENT

An IP multicast distribution system and a streaming data distribution method, and a program therefor, according to the preferred embodiment of the present invention will now be described in detail while referring to the accompanying drawings. Shown in FIGS. 1 to 5 are the IP multicast distribution system and the streaming data distribution method, and the program therefor, according to the embodiment of the present invention.

First, the configuration used for this embodiment will be described while referring to FIG. 1.

Figure 1:
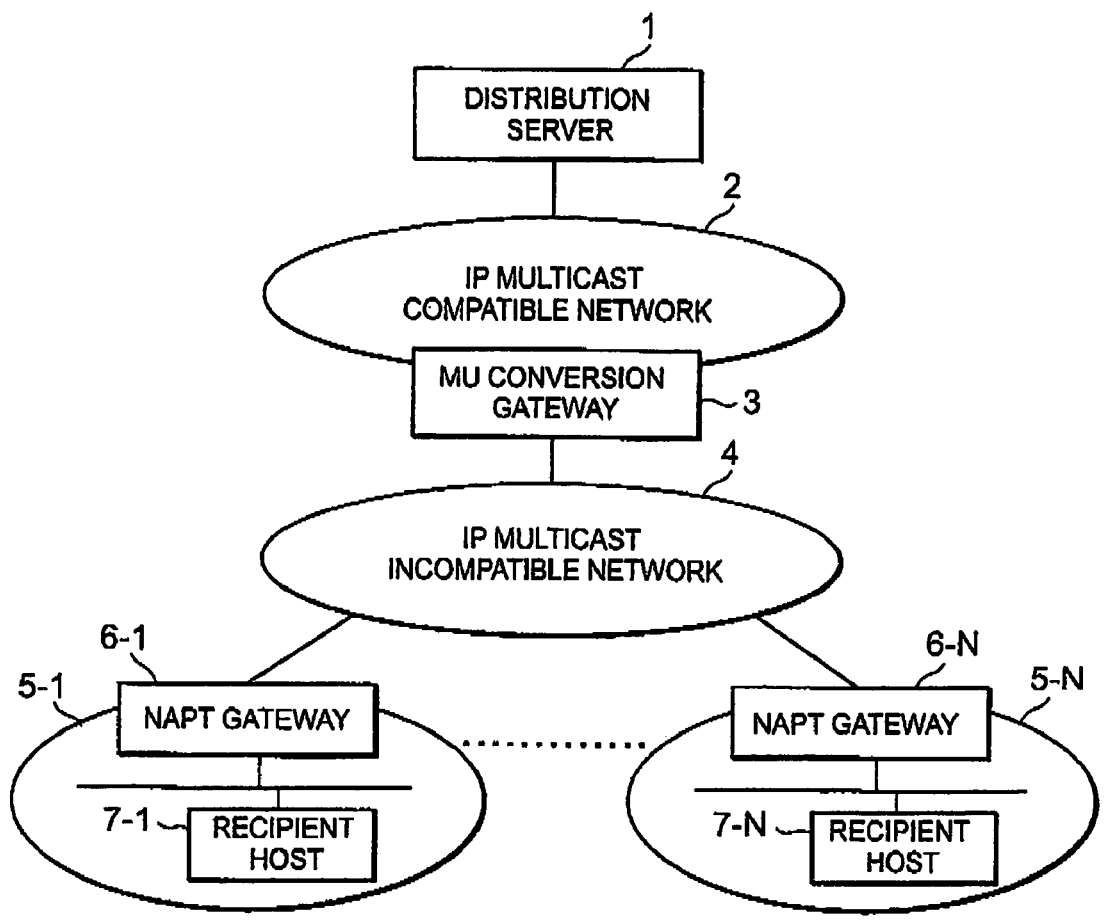
FIG. 1 is a diagram showing a network configuration according to one embodiment of the present invention.

As is shown in FIG. 1, the IP multicast distribution system of the embodiment comprises: a distribution server 1, for distributing IP multicast data; a network (hereinafter referred to as an IP multicast compatible network) 2, which is IP multicasting compatible; a multicast/unicast conversion gateway (hereinafter referred to as an MU conversion gateway) 3, for copying an IP multicast packet and transmitting a unicast packet addressed to an individual end user; a network (hereinafter referred to as an IP multicast incompatible network) 4, which Is not IP multicasting compatible; a plurality of private networks 5-1 to 5-N; NAPT gateways 6-1 to 8-N, for correlating a private address space with a global address space; and recipient hosts 7-1 to 7-N, which are arranged in the respective private networks 5.

Figure 2:
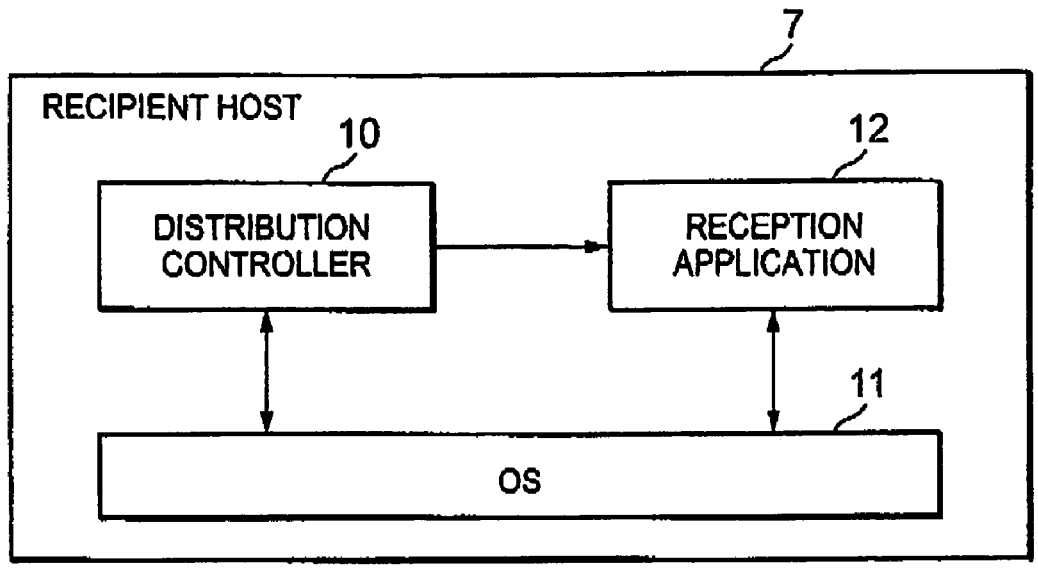
FIG. 2 is a block diagram showing the arrangement of a recipient host.
Figure 3:
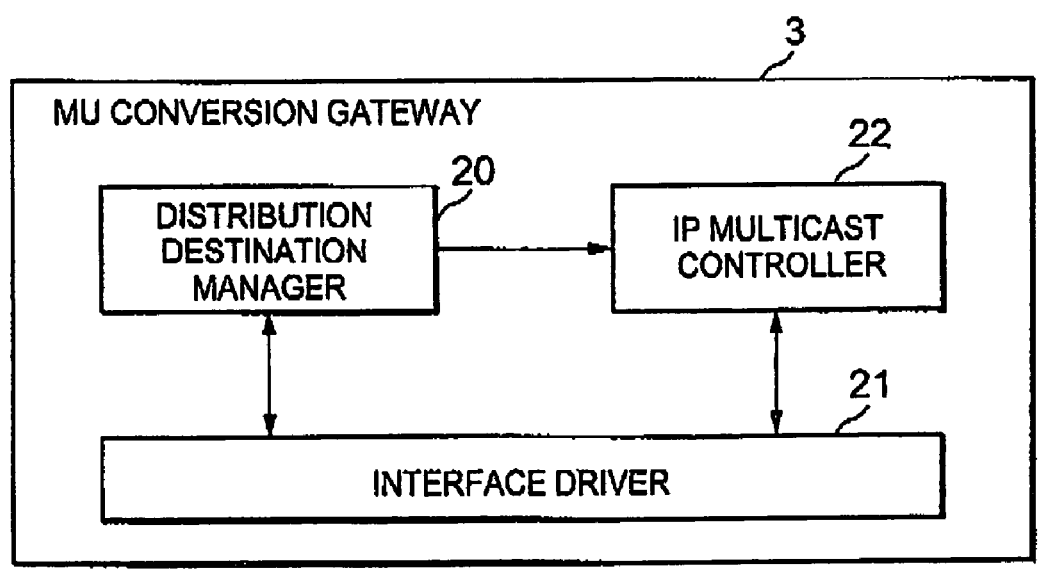
FIG. 3 is a block diagram showing the arrangement of an MU conversion gateway.

FIG. 2 is a block diagram showing the configuration of the recipient host 7, and FIG. 3 is a block diagram showing the configuration of the MU conversion gateway 3.

As is shown in FIG. 2, the recipient host 7 includes a distribution controller 10 and a reception application 12, both of which are operated by an OS 11.

As Is shown in FIG. 3, the MU conversion gateway 3 includes a distribution destination manager 20 and an IP mulficast controller 22, both of which are operated by an interface driver 21.

The reception controller 10 of the recipient host 7 downloads, from a distribution guidance site, the IP address (hereinafter also referred to as an S) of the distribution server 1, a group address (hereinafter also referred to as a G) provided for a plurality of recipient hosts that receive streaming data, a port number (hereinafter also referred to as an APL-Listen) at which the reception application of the recipient host 7 accepts a packet, the IP address of the MU conversion gateway 3, and the acceptance port number (hereinafter also referred to as an L4-MUG) for the MU conversion gateway 3. In this manner, the distribution controller 10 obtains these addresses. The APL-Listen Is a port number that Is determined in advance by the distribution server 1 to enable the reception application of the recipient host 7 for accepting a packet. The recipient host 7 employs this designated port number to transmit a distribution start request.

Further, in accordance with contents selected by a user, the distribution controller 10 transmits, through the OS 11 to the MU conversion gateway 3, a distribution request designating session information.

When a distribution request is passed through the MAPT gateway 6, a source IP address is converted into a global address, and a source port number is converted into a port number corresponding to a requested session. The resultant distribution request is accepted by the distribution destination manager 21 of the MU conversion gateway 3, and upon receiving the distribution request, the distribution destination manager 21 of the MU conversion gateway 3 returns a session ID to the requesting recipient host 7.

Upon receiving the session ID, the distribution controller 10 of the recipient host 7 activates the reception application 12 and transmits a distribution start request to the MU conversion gateway 3.

The distribution designation manager 20 of the MU conversion gateway 3 receives the distribution start request from the recipient host 7 and instructs the IP multicast controller 22 to set up a header conversion entry.

Through this processing, the IP multicast data transmitted by the distribution host is converted into a unicast packet addressed to the recipient host 7, and the NAPT gateway 6 converts the address and the port number Into an address for the recipient host 7 and a port number for the acceptance of the packet by the reception application 12. The unicast packet is then transmitted to the reception application 12 of the recipient host 7.

This configuration of the embodiment has as an objective the enabling of the multiple recipient hosts 7 on the private networks 5 (networks using the private IP address) for the reception, through the IP multicast incompatible network 4 and the NAPT gateway 6, of IP multicast streaming data that is distributed by using the IP multi-network technique.

That is, without a special setup being required, the NAPT gateway 6 is enabled to obtain a correlation between a global IP address and a private IP address, and the port numbers for a transmission and a reception side.

To achieve the above objective, in this embodiment, before the distribution server 1 starts the streaming transmission of a UDP packet, the recipient host 7 provided on the private network 5 outputs a distribution request.

By means such as a Web, the recipient host 7 can obtain in advance the IP address (S) of the distribution server 1, the group address (G) provided for the multiple recipient hosts 7 that receive streaming data, the acceptance port number (APL-Listen) for the reception application 12 of the recipient host 7, and the IP address and the acceptance port number (L4-MUG) for the MU conversion gateway 3.

In accordance with the obtained information, the recipient host 7 designates the IP address of the MU conversion gateway 3 as a designation IP address, a source port number as the APL-Listen port number determined in advance by the distribution server 1, and the acceptance port number (L4-MUG) of the MU gateway 3 as a destination port number. Then, the recipient host 7 transmits, to the MU conversion gateway 3, such information as the IP address (S) of the distribution server 1, the group address (G) provided for multiple recipient hosts that receive the streaming data, and the acceptance port number (APL-Listen) for the reception application 12 of the recipient host 7. It should be noted that the information for S, G and APL-Listen is employed when the MU conversion gateway 3 converts an IP multicast packet to obtain an IP unicast packet.

When the NAPT gateway 6 receives this information, the NAPT gateway 6 changes the source IP address to the global IP address for the NAPT gateway 6 and the source port number to a value (APL-NAPT) designated by the NAPT gateway 6, independently, and transmits the information.

Through this processing, when the NAPT gateway 8 receives a UDP packet for which the global address of the NAPT gateway 6 has been set as the destination IP address, and the APL-NAPT has been set as the destination port number, the NAPT gateway 6 can designate a destination IP address as the local IP address of the recipient host 7 and a destination port number for the destination port number (APL-Listen) determined in advance by the distribution server 1, and can transmit the UDP packet to the private network 5. That is, the NAPT gateway 6 can obtain a relationship between the destination IP address and the destination port number in the global IP address space, and the destination IP address and the destination port number in the private IP address space.

As a result, the NAPT setup for transferring to the recipient host 7 a packet received from the global space, i.e., the setup for transferring a packet having a specific destination port number to a specific recipient host in a private space, is not required, and multiple recipient hosts can accept a streaming distribution service.

Figure 4:
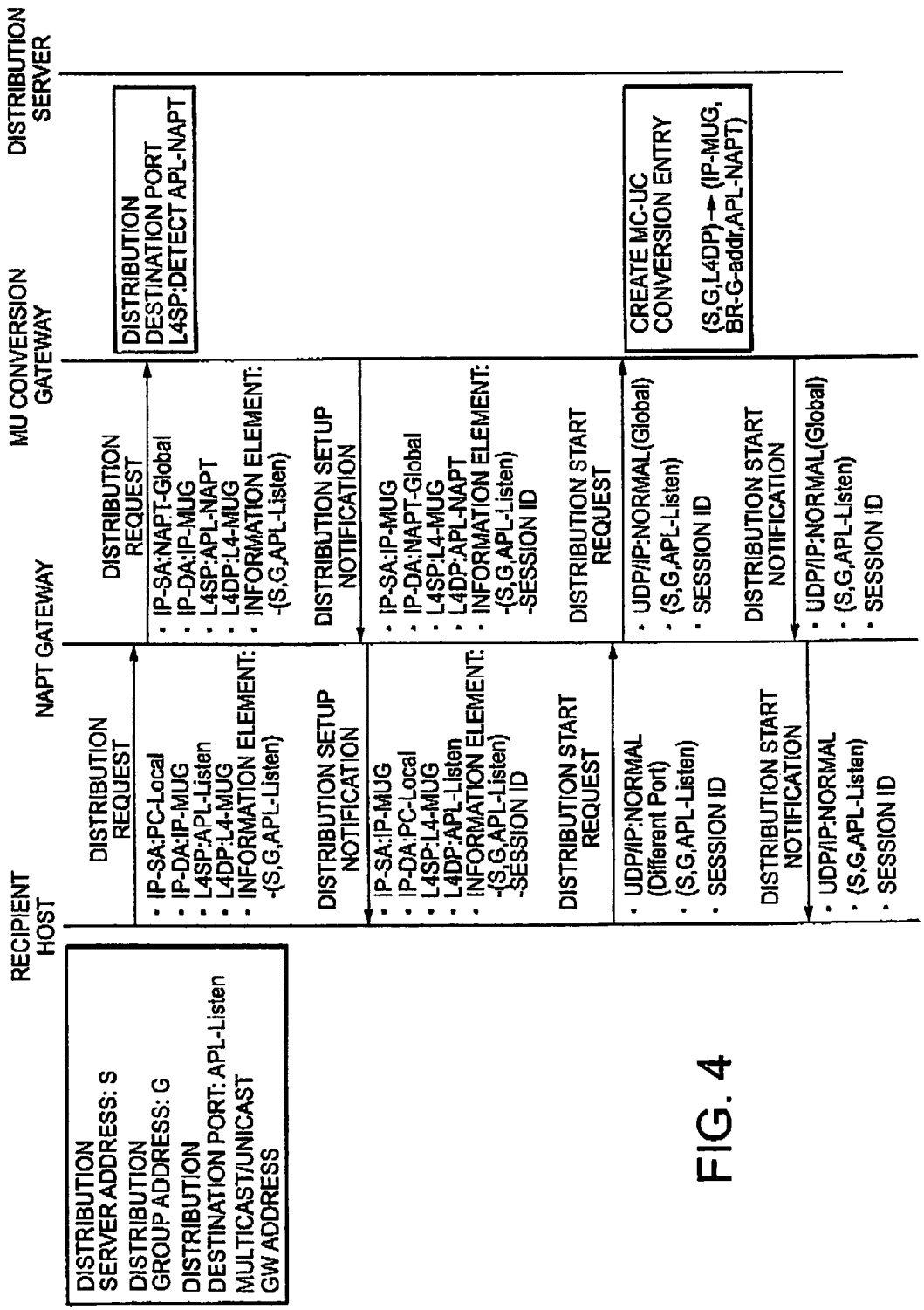
FIG. 4 is a sequence diagram showing the IP multicast data distribution processing.
Figure 5:
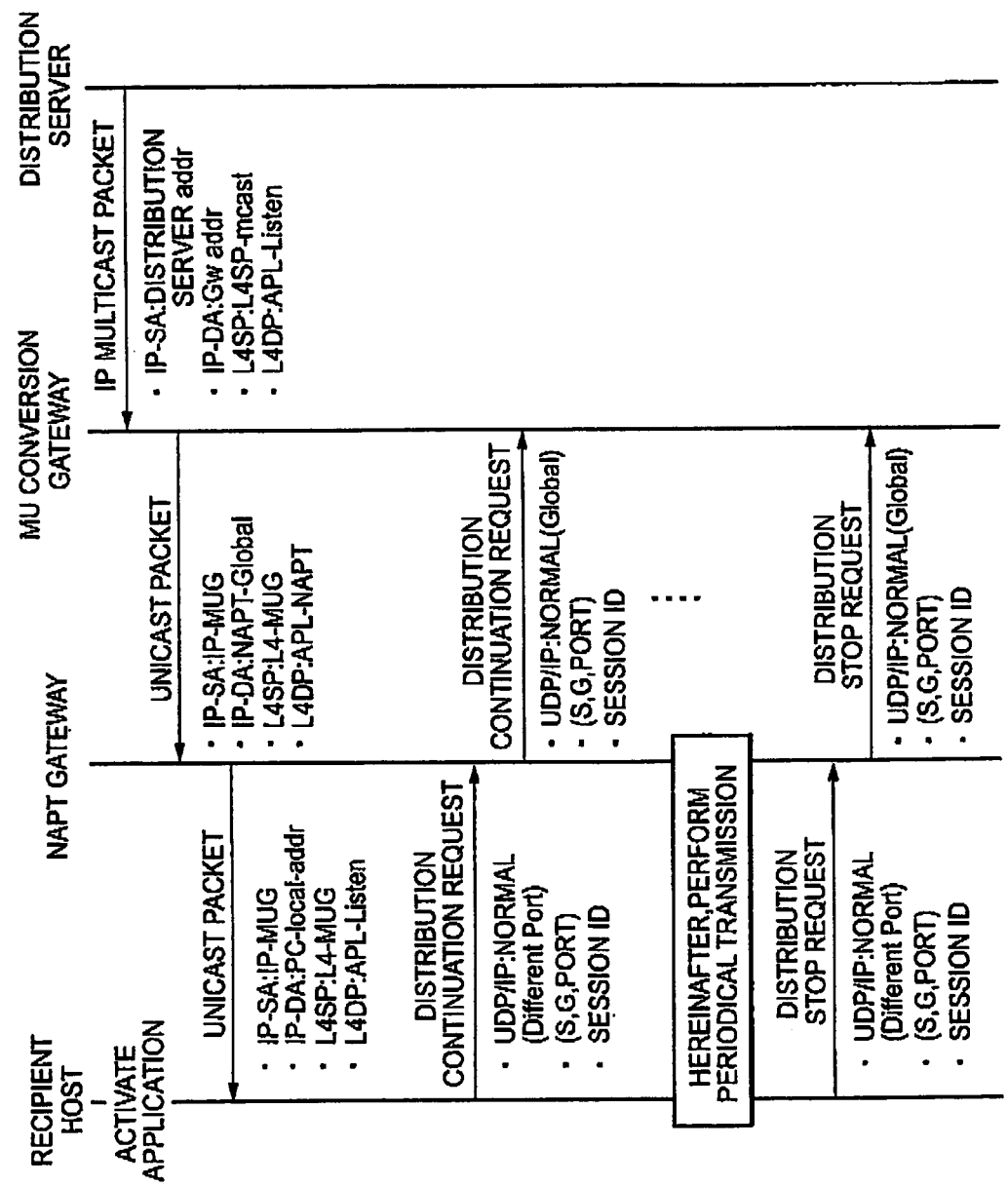
FIG. 5 is a sequence diagram showing the IP multicast data distribution processing.

The operation of the IP mulficast distribution system in this embodiment will now be described while referring the sequences shown in FIGS. 4 and 5.

By specified means, such as HTTP, the recipient host 7 in the private network 6 identifies, in advance, the IP address (S) of the distribution server 1, the port number (APL-Listen) of the reception application 12 that receives a packet, the IP address of the MU conversion gateway 3, and the acceptance port number (L4-MUG) for the MU conversion gateway 3.

First, the recipient host 7 in the private network 5 designates the IP address (IP-DA:MUG in FIG. 4) of the MU conversion gateway 3 as a destination, the local IP address (IP-SA:PC-Local In FIG. 4) of the recipient host 7 as a source IP address, the APL-Listen (L4SP:APL-Listen in FIG. 4) as a source port number, and the L4MUG (L4SP:L4-MUG in FIG. 4) as a destination port number. The recipient host 7 then transmits the information (S, G, APL-Listen) to the NAPT gateway 6 (distribution request). The information (S, G. APL-Listen) is required data when the MU conversion gateway 3 converts IP multicast data to obtain IP unicast data.

Upon receiving the distribution request, the NAPT gateway 6 changes the source IP address to the global IP address (IP-SA:NAPT-Global) for the NAPT gateway 6, and the source port number to a value (L4SP:APL-NAPT) independently designated by the NAPT gateway 6. The NAPT gateway 6 then transmits the resultant distribution request to the MU conversion gateway 3, so that at this time, the NAPT gateway 6 can correlate the IP addresses and the port numbers of the global address space and the private address space, and the transmission of the pertinent packet between the two spaces can be performed.

When the MU conversion gateway 3 receives the distribution request, the MU conversion gateway 3 employs the port number and the other information to return to the recipient host 7 a unique, internally provided, session ID.

Upon receiving the session ID, the recipient host 7 activates the reception application 12, designates another port number as a source port number, and transmits a distribution start request through the NAPT gateway 6 to the MU conversion gateway 3. Then, the reception application 12 of the recipient host 7 designates APL-Listen as a reception port number and is set to the waiting state.

When the MU conversion gateway 3 receives the distribution start request, based on the session ID and the information Included in the previously received distribution request, the MU conversion gateway 3 copies an IP multicast packet received from the distribution server 1 and designates the address of the MU conversion gateway 3 as a source IP address, the global IP address of the NAPT gateway 6 as an destination IP address, the L4-MUG as a source port number, and the APL-NAPT as a destination port number. The MU conversion gateway 3 then transmits a distribution start notification to the NAPT gateway 6.

Since the NAPT gateway 6 has already prepared tables corresponding to the IP addresses and the port numbers, upon receiving the distribution start notification, the NAPT gateway 6 designates the APL-Listen as the destination port number and transmits streaming data to the recipient host 7. The reception application 12 can therefore receive the streaming data normally.

Thereafter, in order to maintain the distribution, the recipient host 7 and the MU conversion gate 3 employ the session ID as a key and periodically exchange a distribution continuation request as control data. Further, to halt the distribution, the recipient host 7 and the MU conversion gateway 3 exchange control data for halting the distribution, or stop the periodical exchange of the control data for distribution continuation.

As is described above, without a special setup being required for the NAPT gateway, the IP multicast data can be converted into a packet for individual unicast addresses, and data can be transmitted to a plurality of recipient hosts located in the private address spaces.

This embodiment is merely an example application for the present Invention, which not only is not limited to this embodiment but can be variously modified without departing from the subject of the invention. For example, for the MU conversion gateway 3, a conversion data management device for converting an IP multicast packet to obtain an IP unicast packet and a device for performing packet copying and packet header conversion may be separately provided.

As is apparent from the above explanation, according to the present Invention, before accepting streaming distribution from the distribution server, the recipient host transmits, to the NAPT gateway, a distribution request, for which a destination address is designated, to the IP address of the multicast/unicast conversion gateway, the source port number, which has been determined in advance by the distribution server, is designated the port number to enable the reception application of the recipient host to receive data, and the destination port number is designated the acceptance port number of the multicast/unicast conversion gateway. Upon receiving the distribution request, the NAPT gateway sets the global IP address of the NAPT gateway as the source IP address and a predetermined port number as the source port number, and transmits the distribution request to the multicast/unicast conversion gateway.

What is claimed is:

1. An IP multicast distribution system comprising:
    a distribution server which generates an IP multicast packet with UDP packet format;
    a multicast/unicast conversion gateway which receives the multicast IP packet generated by the distribution server and which converts the IP multicast packet to an IP unicast packet; and
    an NAPT gateway which receives the IP unicast packet converted by the multicast/unicast conversion gateway and which transfers the IP unicast packet to a recipient host in a private network,
    wherein:
    if the NAPT gateway receives an IP unicast packet whose destination IP address is the global IP address of the NAPT gateway and whose destination port number has been designated by the NAPT gateway:
    the NAPT gateway converts the value of the destination IP address included in the IP unicast packet to the local IP address of the recipient host in the private network, and converts the value of the destination port number included in the IP unicast packet to a port number which the recipient host has designated to receive data; and
    the NAPT gateway sends the IP unicast packet to the recipient host through the private network,
    wherein the IP multicast packet transmits streaming data, and
    wherein:
    before receiving the IP unicast packet by the NAPT gateway, the recipient host sends a distribution request for the IP unicast packet to the NAPT gateway, the distribution request comprising the global IP address of the multicast/unicast conversion gateway as its designation IP address, a source port number which the distribution server has designated in order that a recipient application program executed on the recipient host receives packets corresponding to the request, and a designation port number as an acceptance port number for the multicast/unicast conversion gateway;
    in response to the distribution request, the NAPT gateway designates the global IP address of the NAPT gateway as a source IP address, and the acceptance port number as a source port number; and
    the NAPT gateway sends the distribution request to the multicast/unicast conversion gateway.

2. The IP multicast distribution system claimed in claim 1, wherein the distribution server and the multicast/unicast conversion gateway communicate over an IP multicast compatible network and the multicast/unicast conversion gateway and the NAPT gateway communicate over an IP multicast incompatible network.

3. A data distribution method, for an IP multicast distribution system comprising:
    a distribution server which generates an IP multicast packet with UDP packet format;
    a multicast/unicast conversion gateway which receives the multicast IP packet generated by the distribution server and which converts the IP multicast packet to an IP unicast packet; and
    an NAPT gateway which receives the IP unicast packet converted by the multicast/unicast conversion gateway and which transfers the IP unicast packet to a recipient host in a private network,
    wherein the method comprises, at the NAPT gateway, a packet header conversion step for:
    receiving an IP unicast packet whose destination IP address is the global IP address of the NAPT gateway and whose destination port number has been designated by the NAPT gateway;
    converting the value of the destination IP address included in the IP unicast packet to the local IP address of the recipient host in the private network;
    converting the value of the destination port number included in the IP unicast packet to a port number which the recipient host has designated to receive data; and
    sending the IP unicast packet to the recipient host through the private network,
    wherein the IP multicast packet transmits streaming data, and
    wherein:
    before receiving the IP unicast packet by the NAPT gateway, the recipient host sends a distribution request for the IP unicast packet to the NAPT gateway, the distribution request comprising the global IP address of the multicast/unicast conversion gateway as its designation IP address, a source port number which the distribution server has designated in order that a recipient application program executed on the recipient host receives packets corresponding to the request, and a designation port number as an acceptance port number for the multicast/unicast conversion gateway;
    in response to the distribution request, the NAPT gateway designates the global IP address of the NAPT gateway as a source IP address, and the acceptance port number as a source port number; and
    the NAPT gateway sends the distribution request to the multicast/unicast conversion gateway.

4. A computer program product comprising a computer readable medium storing computer readable program code that, when executed by a computer, performs a data distribution method carried out by an IP multicast distribution system comprising:

computer readable program code for causing a distribution server to generate IP multicast packet with UDP packet format;

computer readable program code for causing a multicast/unicast conversion gateway to convert the IP multicast packet received from the distribution server to an IP unicast packet; and computer readable program code for causing a NAPT gateway to transfer the converted IP unicast packet received from the multicast/unicast conversion gateway to a recipient host in a private network, wherein according to execution of the program, the NAPT gateway performs the following processes of:

receiving an IP unicast packet whose destination IP address is the global IP address of the NAPT gateway and whose destination port number has been designated by the NAPT gateway;

converting the value of the destination IP address included in the IP unicast packet to the local IP address of the recipient host in the private network;

converting the value of the destination port number included in the IP unicast packet to a port number which the recipient host has designated to receive data; and sending the IP unicast packet to the recipient host through the private network, wherein the IP multicast packet transmits streaming data, and wherein:

before receiving the IP unicast packet by the NAPT gateway, the recipient host sends a distribution request for the IP unicast packet to the NAPT gateway, the distribution request comprising the global IP address of the multicast/unicast conversion gateway as its designation IP address, a source port number which the distribution server has designated in order that a recipient application program executed on the recipient host receives packets corresponding to the request, and a designation port number as an acceptance port number for the multicast/unicast conversion gateway, in response to the distribution request, according to execution of the program, the NAPT gateway performs the following processes of:

designating the global IP address of the NAPT gateway as a source IP address, and the acceptance port number as a source port number; and sending the distribution request to the multicast/unicast conversion gateway.

* * * * *